Oct. 20, 1936.  J. H. HOWARD ET AL  2,058,155
WELL TOOL CONSTRUCTION
Filed May 25, 1934    2 Sheets-Sheet 2
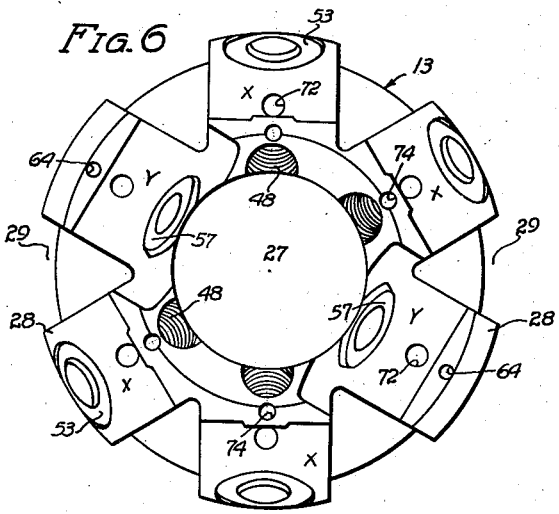
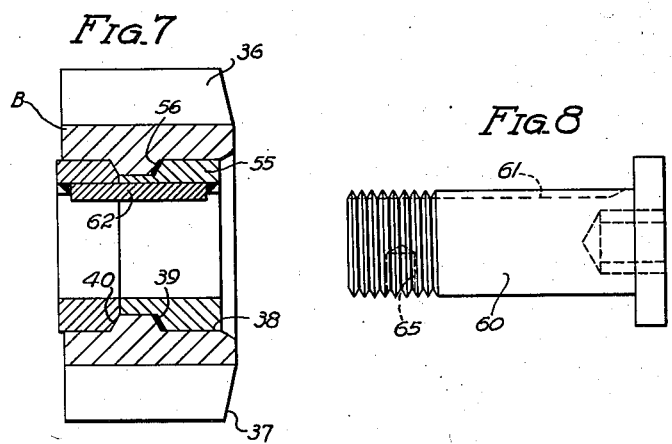
INVENTORS
JOHN H. HOWARD
ALFRED C. CATLAND
PER
ATTORNEY Patented Oct. 20, 1936

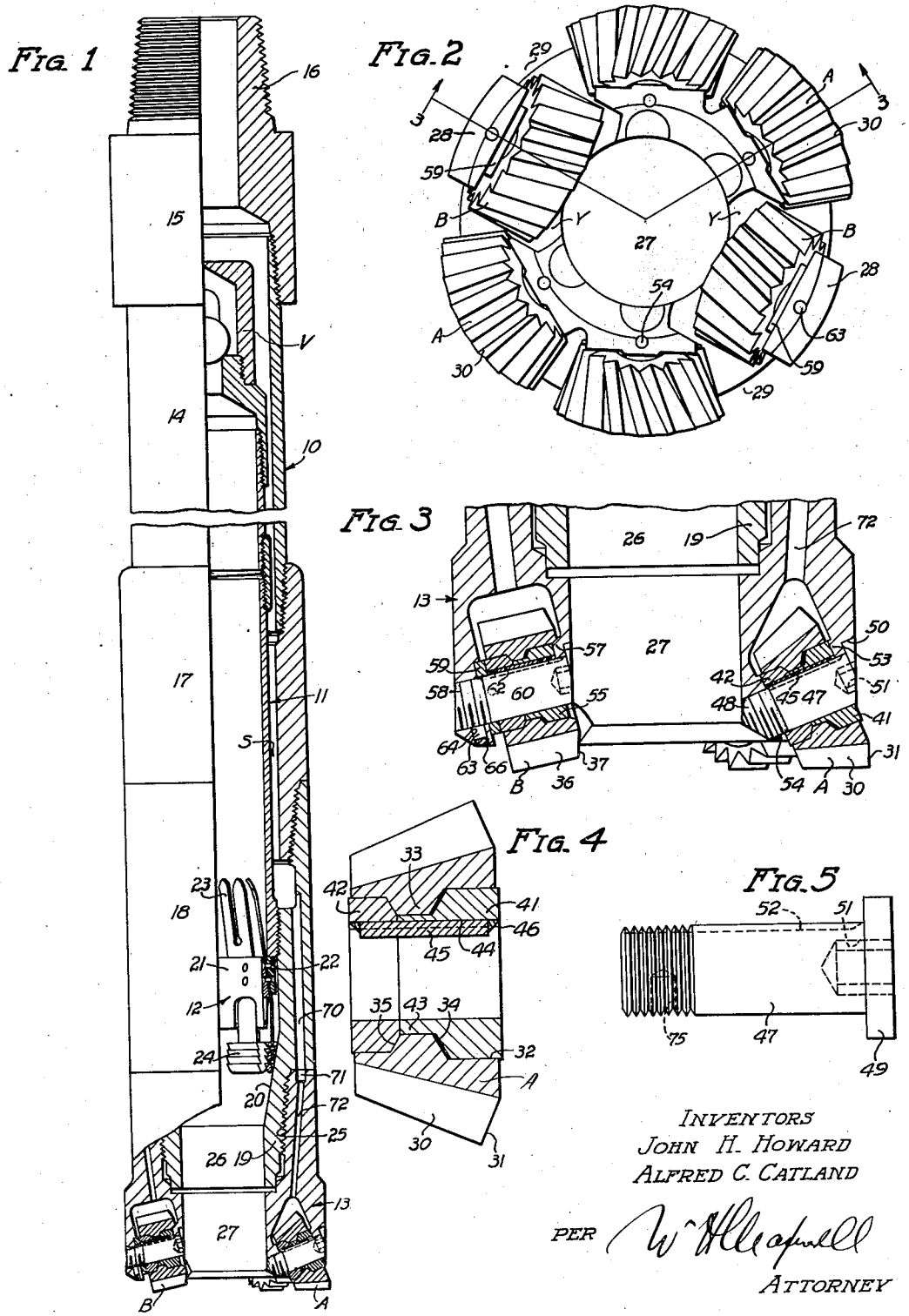

2,058,155

UNITED STATES PATENT OFFICE 2,058,155

WELL TOOL CONSTRUCTION

John H. Howard, Huntington Park, and Alfred C. Catland, Alhambra, Calif., assignors to Globe Oil Tools Company, Los Nietos, Calif., a corporation of California Application May 25, 1934, Serial No. 727,499

5 Claims. (Cl. 255—72)

This invention relates to a well drilling tool and relates more particularly to an improved construction for a core drill for use in the rotary method of well drilling. A general object of this invention is to provide a sturdy, practical and particularly efficient rock core drill.

In well drilling tools embodying roller cutters it has been a common practice to weld the cutter carrying pins to the bit head or weld the pin retaining parts to the bit head. The excessively high temperatures to which the bit head is subjected during the large amount of welding necessary in carrying on such operations have injurious effects on the metal of the bit head, weakening the head and making it soft so that it wears very quickly.

An object of this invention is to provide a simple, effective means for rotatably mounting cutters in a bit head without extensive welding and without weakening the bit head.

Another object of the invention is to provide a well tool construction including a bit head having recesses for receiving cutters and means for rotatably mounting the cutters in the recesses which means securely ties together the portions of the head at the inner and outer sides of the recesses providing a strong, rigid assembly capable of withstanding heavy strains.

Another object of the invention is to provide a core drill bit head of the character mentioned in which the pins for rotatably carrying the cutters are in the nature of bolts which are first tightly threaded in place to rigidly connect the walls of the head at the opposite sides of the recesses and are then positively locked against unthreading and displacement.

Another object of the invention is to provide a core drill construction of the character mentioned in which the cutter assemblies are mounted in the bit head so that they may be easily and quickly replaced in a small shop and with little equipment.

Another object of the invention is to provide a novel and improved bushing assembly for rotatably carrying a roller cutter of a well drilling tool.

Other objects and features of the invention will be better and more fully understood from the following detailed description of a typical preferred form and application of the invention, throughout which description reference will be had to the accompanying drawings, in which:

Fig. 1 is a side elevation of a core drill embodying the present invention, with one quarter in longitudinal cross section and showing a portion of the bit head broken away to appear in longitudinal cross section. Fig. 2 is an enlarged bottom view of the drill. Fig. 3 is an enlarged transverse detailed sectional view taken as indicated by line 3—3 on Fig. 2. Fig. 4 is an enlarged longitudinal detailed sectional view of one of the outer cutters and its bushing removed from the drill. Fig. 5 is an enlarged side elevation of one of the outer cutter carrying pins. Fig. 6 is an enlarged bottom view with cutter removed. Fig. 7 is an enlarged longitudinal detailed sectional view of one of the inner cutters, and Fig. 8 is an enlarged side elevation of an inner cutter carrying pin.

The core drill provided by this invention includes, generally, an outer barrel 10, an inner barrel 11 for receiving the core, a core catcher 12 and a bit head 13 on the lower end of the outer barrel 10 having a plurality of replaceable cutters A and B.

The outer barrel 10 is an elongate tubular structure adapted to be attached to the lower end of a drilling string of rotary drill pipe or the like. In the embodiment of the invention illustrated in the drawings the barrel 10 includes a main section 14 provided at its upper end with a connecting member or sub 15. The sub 15 has a tapered screw-threaded pin 16 for facilitating connection of the barrel 10 with the drilling string. A connecting member 17 is threaded on the lower end of the section 14 and carries a sub 18. The sub 18 is provided to carry the bit head 13 and has a screw-threaded pin 19 on its lower end. The lower portion of the opening 20 in the sub 18 is tapered downwardly and inwardly for the purpose to be subsequently described.

The inner barrel 11 is arranged longitudinally in the barrel 10 to receive the core cut by the cutters A and B of the bit head. In accordance with the usual practice the inner barrel 11 is spaced from the interior of the outer barrel 10 to provide an annular space S for the downward passage of the circulation fluid. The lower end of the inner barrel 11 is screw-threaded in the opening 20 of the sub 18 at a point spaced some distance above the tapered portion of the opening. A suitable valve V is provided on the upper end of the inner barrel 11 to prevent the downwardly flowing circulation fluid from entering the inner barrel and to permit the escape of trapped fluid from the inner barrel.

The core catcher 12 is arranged within the drill to grip and retain the core when the drill is raised to recover the core. In accordance with the broader aspects of the invention any suitable form of core catcher may be embodied in the drill. The particular core catcher 12 illustrated in the drawings includes a tubular body 21 arranged in the opening 20 between the lower end of the inner barrel 11 and the tapered portion of the opening. The lower end of the inner barrel 11 forms a downwardly facing shoulder 22 for limiting the upward movement of the core catcher. Spring members 23 are arranged against the periphery of the body 21 and extend longitudinally thereof to project beyond the upper and lower ends of the body. The upper projecting portions of the spring members 23 are bent inwardly and are bifurcated to engage and bite into the core. Core gripping slips 24 are attached to the lower projecting portions of the spring members 23. The inner sides of the slips 24 are toothed to grip the core while the outer sides of the slips are inclined downwardly and inwardly to slidably engage the tapered wall of the opening 20. The core catcher has limited longitudinal movement in the sub 18 and upon upward movement of the drill to recover the core the spring members 23 yieldingly engage the core to resist movement of the catcher so that the tapered wall of the opening 20 cooperates with the slips 24 to force them inwardly to obtain a firm grip on the core.

The bit head 13 is an annular or tubular member provided on the lower end of the outer barrel 10 and carries the cutters A and B for making an annular cut in the earth formation. In the preferred form of the invention disclosed in the drawings the bit head 13 is comparatively short and is integral. A socket 25 is provided in the upper end of the bit head 13 to receive the threaded pin 19 on the end of the sub 18. A reduced extension 26 is provided on the lower end of the pin 19 to fit a reduced portion in the bottom of the socket 25. The central opening 27 of the bit head 13 is of substantially the same diameter as the lower portion of the opening 20. The lower end of the bit head 13 may be bevelled as illustrated throughout the drawings. In accordance with the invention the bit head may be heat treated or otherwise hardened to be long wearing.

The invention provides two groups or sets of sockets or recesses in the lower end of the bit head 13 for carrying or receiving the cutters A and B. While there may be any suitable number of recesses in the end of the bit head 13 it is preferred to have two spaced pairs of recesses X for carrying two pairs of cutters A and two diametrically opposite recesses Y for carrying two cutters B. The recesses X and Y extend into the bit head from its lower end so that the cutters may project downwardly from the bit head to engage the formation at the bottom of the well bore. The bit head 13 is provided with a plurality of circumferentially spaced lugs or wings 28 which constitute the outer walls of the recesses X and Y or provide material at the outer sides of the recesses. The spaces 29 between the wings 28 form longitudinal water courses or passage for the circulation fluid flowing upwardly at the exterior of the drill. The recesses X for carrying the cutters A have their inner and outer side walls inclined downwardly and outwardly. The two recesses X at the opposite sides of the bit head are relatively close to one another while the recesses Y are spaced considerable distances from the adjacent recesses X. The inner and outer walls of the recesses Y are substantially parallel and are inclined downwardly and inwardly. The recesses X and Y are open at the opposite vertical sides of the several wings 28.

The cutters A and B are rotatable in their respective recesses X and Y and project downwardly from the lower end of the bit head 13 to act on the formation at the bottom of the well bore. The cutters A which we will term the outer cutters engage the outer portion of the bottom of the bore and project outwardly beyond the periphery of the bit head to ream or cut the bore to size. The cutters B which are the inner cutters engage the inner portion of the bottom of the well bore and trim the core for reception in the opening 27. The outer cutters A are frustro-conical in general configuration having flat opposite ends and a pitched or inclined periphery. The cutters A are provided with peripheral cutting parts or teeth 30. One cutter A of each pair has straight axial cutting teeth 30 while the other cutter of the pair has helical or spiral cutting teeth. The spiralled cutting teeth 30 of the two cutters at the opposite sides of the head 13 are pitched or spiralled in opposite directions, the teeth of one cutter being pitched in a right hand direction, the teeth of the other being pitched in a left hand direction. The above described relationship between the cutting parts 30 of the four cutters A prevents tracking of the teeth in their engagement with the formation and provides for a rapid efficient cutting action. The outer peripheral corners of the cutters A are bevelled or inclined to provide reaming cutting edges 31. The cutters A are provided with central longitudinal openings 32. Each opening 32 has an annular or continuous restriction 33 whose ends form inclined thrust shoulders 34 and 35. The outer portions of the openings 32 may be somewhat larger in diameter than the portions of the openings at the opposite sides of the restrictions.

The inner cutters B are substantially cylindrical in their general configuration and have flat normal ends. Peripheral cutting teeth 36 are provided on the cutters B. The cutting teeth 36 are spiralled. The teeth 36 of one cutter B are pitched in a right hand direction while the teeth 36 of the other cutter B are pitched in a left hand direction. The inner ends or corners of the cutting teeth 36 are cut away or bevelled as at 37 to properly trim the core. Central longitudinal openings 38 are provided in the cutters B. The openings 38 have annular reduced portions between their ends providing inwardly and outwardly facing shoulders 39 and 40.

The means for rotatably mounting the cutters A and B in the recesses X and Y is an important feature of the invention. In accordance with the invention the cutter carrying or mounting means does not necessitate any appreciable welding, strengthens and reinforces the bit head 14 and is such that the cutters may be easily and quickly replaced. The means for rotatably supporting or mounting the outer cutters A includes a pair of bushings 41 and 42 in the opening 32 of each cutter. The bushings 41 are arranged in the outer portions of the openings 32 and have their inner ends cooperating with the shoulders 34. The bushings 42 are arranged in the inner portions of the openings 32 and their inner ends cooperate with the shoulders 35. The bushings 41 have reduced extensions 43 extending through the restrictions 33 and engaging the ends of the bushings 42. The bushings 41 or 42 may project slightly from the opposite ends of the cutters.

The invention provides a novel means for connecting the two bushings 41 and 42 of each cutter A to provide a readily handled assembly. A longitudinal keyway 44 is provided in the interior of the abutting bushings. A key 45 is arranged in the keyway and has its ends spaced inwardly from the opposite ends of the bushing assembly. The end portions of the keys 45 are welded to the bushings 41 and 42 at 46. The keys 45 serve to connect the bushings 41 and 42 and facilitate the assembling of the cutters and bushings in the bit head.

Pins 47 extend through the bushings 41 and 42 to rotatably support the cutters A in the recesses X. Openings 48 are provided in the bit head 13 to carry the opposite end portions of the pins 47. The openings 48 intersect the recesses X and their longitudinal axes are inclined downwardly and inwardly, being substantially normal to the inclined walls of the recesses. The inner portions of the openings 48 in the inner wall of the bit head 13 are threaded. The cutter carrying pins 47 are in the nature of screws or bolts having threaded end portions threaded into the inner ends of the openings 48 and having heads 49 on their outer ends. The heads 49 are partially received in counter bores 50 in the outer sides of the wings 28. Polygonal sockets 51 are provided in the outer ends of the pins 47 to receive a wrench for threading the screws into and out of the openings 48. The pins 47 have longitudinal keyways 52 for cooperating with the keys 45. Bosses 53 are provided on the inner and outer walls of the recesses X around the openings 48. The bosses 53 cooperate with the slightly projecting bushings 41 and 42 to space the opposite ends of the cutters A from the walls of the recesses.

In assembling the drill the cutters A with their bushing assemblies 41—42 are arranged in the recesses X and the pins 47 are passed through the openings 48 and the bushings. The pins 47 are then tightly threaded in the openings 48. The pins 47 when tightly threaded in the openings 48 rigidly connect the wings 28 with the body of the bit head to reinforce and strengthen the head so that it is capable of withstanding severe strains. The portions of the heads 49 extending beyond the counter bores 50 may be ground off so that the outer ends of the pins 47 are flush with the surfaces of the wings 28. In a like manner the inner ends of the pins 47 may be ground off flush with the wall of the opening 27.

Means is provided for positively locking the pins 47 against unthreading and displacement. Openings 74 are provided in the lower end of the bit head 13 to join the openings 48. After a pin 47 has been threaded into an opening 48, as described above, a drill is passed through an opening 74 and a socket 75 is drilled in the pin. A lock pin 54 is then inserted in the opening 74 and socket 75 and the outer end portion of the opening 74 is welded up. The pin 54 positively locks the cutter carrying pin 47 against displacement. The several cutter carrying pins 47 may be locked against displacement by the pins 54 in the manner just described. It is to be noted that the welding in the openings 74 is the only welding required in mounting the cutters A in the bit head. Only a very small amount of welding is required to retain the lock pins 54 in place. The cutters A rotatably mounted in the recesses X as above described are rotatable about axes inclined downwardly and inwardly and project downwardly and outwardly from the lower ends of the recesses to have their cutting parts 30 substantially horizontal where they engage the formation at the bottom of the well bore.

The outer cutters B are rotatably supported by means very similar to the mounting means of the cutters A just described. Sectional bushings 55 are arranged in the openings 38 of the cutters B and have shoulders or ends 56 for cooperating with the shoulders 39 and 40. A boss 57 is provided on the inner wall of each recess Y around an opening 58 which extends through the bit head to intersect the recess. The openings 58 are inclined downwardly and outwardly having longitudinal axes substantially normal to the inclined walls of the recesses Y. The inner ends of the cutters B are recessed to receive the bosses 57 and spacing washers 59 are provided at the outer ends of the bushing assembly 55 to permit the arrangement of the cutters B over the bosses and to space the cutters from the outer walls of the recesses.

Pins 60 are passed outwardly through the openings 58 and the bushing assemblies 55 to rotatably support the cutters B in the recesses. The outer end portions of the pins 60 are threaded in the openings 58 and heads are provided on the inner ends of the pins to seat in counterbores in the bit head. The pins 60 have longitudinal keyways 61 receiving the keys 62 of the bushing assemblies 55. The pins 60 are adapted to be tightly threaded in the openings 58 to securely and rigidly connect the wings 28 with the inner wall portion of the bit head. The portions of the pin heads projecting beyond the counterbores may be ground off so that the cutters are flush with the wall of the opening 27. Lock pins 63 are passed through openings 64 in the lower end of the bit head to cooperate with sockets 65 in the pins 60. The sockets 65 may be drilled in the pins by means of a drill passed through the openings 64 subsequent to the threading of the pins in the openings 58. Welding 66 in the lower ends of the openings 64 retains the lock pins 53 in place.

Means is provided for handling the circulation fluid and for flushing the cutters A and B. The sub 18 is provided with spaced longitudinal fluid passages 70 which extend downwardly from the lower end of the annular space S to an annular groove 71 in the upper end of the bit head 13. Spaced ports 72 extend downwardly from the groove 71 to the upper ends of the recesses X and Y. The circulation fluid pumped downwardly through the drilling string passes through the space S and ports 70 to the annular groove 71 where it is distributed to the ports 72. The ports 72 discharge the circulation fluid downwardly against the upper ends of the roller cutters A and B to effectively flush the cutters.

It is believed that the operation of the core drill provided by the present invention will be readily apparent from the foregoing detailed description. The drill is attached to the lower end of a drilling string which is rotated in the usual manner to cause the drill to form an annular bore and leave a core for reception by the inner barrel 11. The two pairs of outer cutters A are effective in drilling the bore to size and in acting on a substantial portion of the bottom of the well bore. The cutters B cut the inner portion of the bore and form the core. Due to the relationship between the cutting teeth of the two pairs of cutters A and the cutting teeth of the diametrically opposite cutters B the drill is very rapid and efficient in operation. The cutting parts or teeth related as described above do not track one after the other in their engagement with the formation. The cutter carrying pins 47 and 60 rigidly and dependably connect the wall portions of the bit head at the opposite sides of the recesses X and Y to greatly strengthen the bit head structure. The cutters A and B are mounted for free rotation on the sectional bushings. The oppositely facing internal shoulders of the cutters directly bear on the ends of the sections of the bushings to transmit end thrusts to the bushings. The ends of the bushings bear on the side walls of the recesses X and Y. The keys connecting the sections of the bushings operate to prevent rotation of the bushings on the pins. The cutters A and B may be easily and quickly removed from the bit head for replacement without employing special tools or equipment.

Having described only a typical form and application of our invention we do not wish to be limited or restricted to the specific form and application herein set forth, but wish to reserve to ourselves any modifications or variations that may appear to those skilled in the art or fall within the scope of the following claims.

Having described our invention, we claim:

1. In a well drill, a roller cutter having a longitudinal opening, oppositely facing shoulders in the opening, and a bushing for the cutter comprising two sections in the opening each having a face cooperating with a shoulder, a keyway in the bushing, and a key cooperating with the keyway and attached to the sections to connect them.

2. In a well drill, a pin having a keyway, a roller cutter having a longitudinal opening, axially facing shoulders on the wall of the opening, a sectional bushing in the opening cooperating with the shoulders, there being a keyway in the bushing, and a key attached to the sections of the bushing to connect them and cooperating with the keyways.

3. In a well drill, a pin having a keyway, a roller cutter having a longitudinal opening, oppositely facing shoulders on the wall of the opening, two bushing sections in the opening passing the pin, each section having an axially facing shoulder cooperating with a shoulder in the opening, and a member attached to said sections to connect them and cooperating with the keyway to hold the sections against turning.

4. A well drill including a barrel, a tubular bit head on the lower end of the barrel having spaced recesses in its lower end and inclined openings intersecting the recesses, pins extending through the recesses and threaded in the openings to rigidly tie together the portions of the head at opposite sides of the recesses, roller cutters in the recesses having longitudinal openings, oppositely facing shoulders in the openings of the cutters, and bushings keyed to the pins and rotatably carrying the cutters, the bushings having shoulders cooperating with the shoulders in the cutter openings.

5. A well drill including a barrel, a tubular bit head on the lower end of the barrel having spaced recesses in its lower end and inclined openings intersecting the recesses, pins extending through the recesses and threaded in the openings to rigidly tie together the portions of the head at opposite sides of the recesses, means positively locking the pin against unthreading, roller cutters in the recesses having longitudinal openings, oppositely facing shoulders in the openings of the cutters, and bushings keyed to the pins and rotatably carrying the cutters, the bushings having shoulders cooperating with the shoulders in the cutter openings.

JOHN H. HOWARD.
ALFRED C. CATLAND.